Patented May 13, 1924.

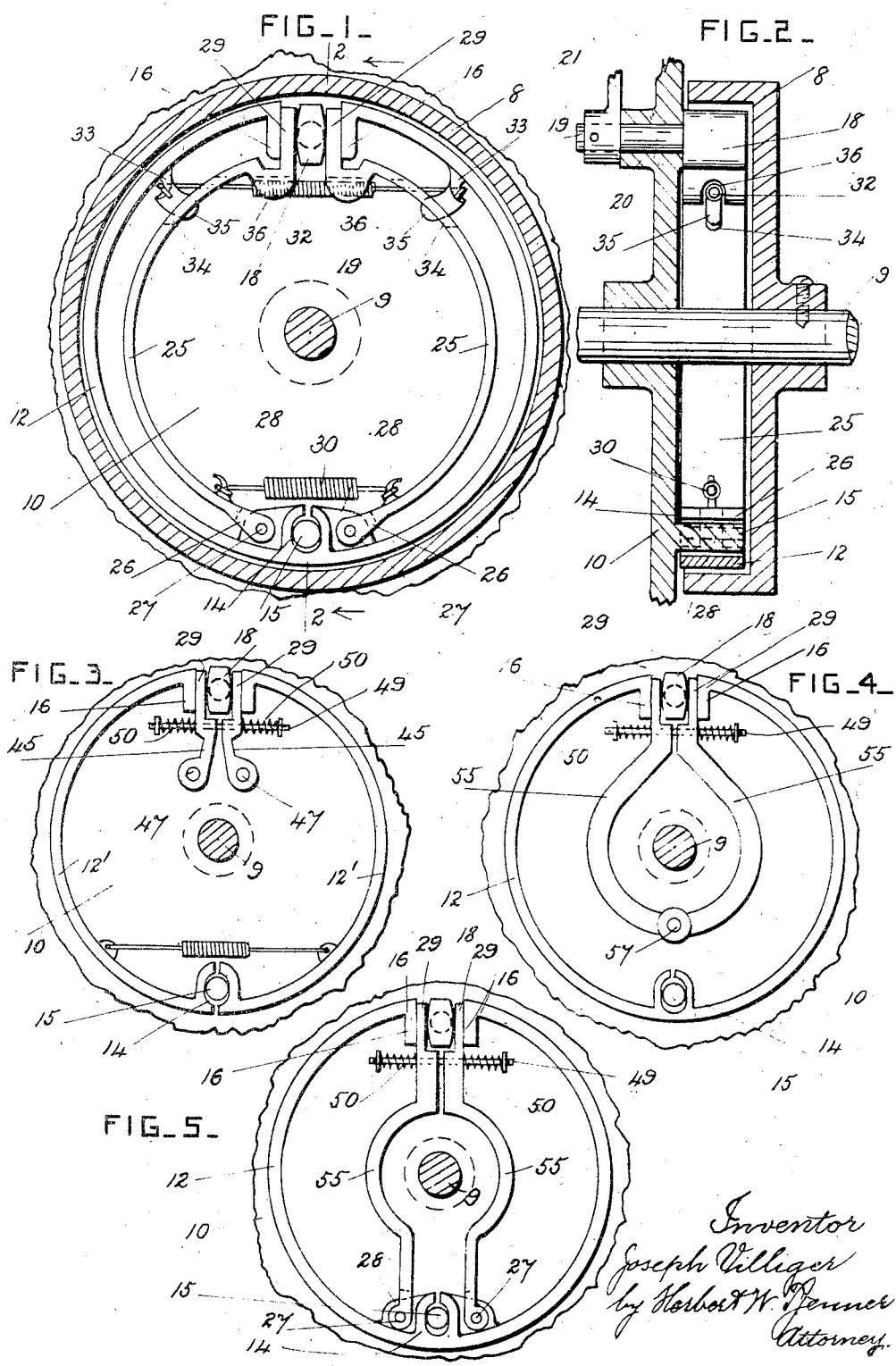

1,493,910

UNITED STATES PATENT OFFICE.

JOSEPH VILLIGER, OF DIXON, ILLINOIS.

VEHICLE BRAKE.

Application filed August 6, 1923. Serial No. 655,869.

*To all whom it may concern:*

Be it known that I, JOSEPH VILLIGER, a citizen of the United States, residing at Dixon, in the county of Lee and State of Illinois, have invented certain new and useful Improvements in Vehicle Brakes, of which the following is a specification.

This invention relates to brakes which are used on motor cars and provided with pivoted expansion members; and it consists in the novel construction and combination of the parts hereinafter fully described and claimed whereby the expansion members are expanded in such a way as to prevent the brake cylinders from being worn away unevenly. When a cam is used to force the ends of the expansion member into engagement with the brake drum, and the cam bears directly on the said ends, one end is forced outwardly and the other end is forced inwardly of the center of the brake drum. When the parts stand in the positions shown in Fig. 1, and the cam is turned clockwise, and lugs or wear plates are provided between the ends of the expansion member and the cam, and the said lugs or wear plates are supported as shown, the ends of the expansion member are forced apart on lines substantially at a right angle to the parallel faces of the lugs or wear plates against which the cam bears. If the lugs or wear plates were not provided, the right hand end of the expansion member would be forced downwardly, and the left hand end upwardly, on lines diagonal of the faces against which the cam would bear.

In the drawings, Figure 1 is a front view of a brake constructed according to this invention, and showing the brake cylinder in section. Fig. 2 is a cross-section through the brake, taken on the line 2—2 in Fig. 1. Figs. 3, 4 and 5 are front views of expansion members and expansion levers similar to those shown in Fig. 1, but showing various modifications.

A brake cylinder or drum 8 is provided, and is secured on the revoluble axle 9 of the car, or other similar revoluble shaft. A stationary carrier 10 for the brake mechanism is provided, and is arranged adjacent to the brake cylinder 8. The expansion member 12 is similar to a spring split ring, and it is arranged inside and substantially concentric with the brake cylinder 8, and its middle part is provided with a socket 14 which engages with a supporting pin or projection 15 on the carrier 10. The free ends of the expansion member are provided with lugs 16 arranged substantially parallel to each other and affording wearing surfaces of large area. A cam 18 is secured on a shaft 19 which is journaled in a bearing 20 on the carrier 10, and is provided with a handle 21 or other convenient means for operating it.

The cam 18 is arranged between the lugs 16, and is turned so as to expand the expansion member. When the cam is arranged to bear directly on the lugs 16, as in brakes ordinarily constructed, it thrusts the lugs apart in an unsatisfactory manner, and causes the brake cylinder and expansion member to wear unevenly and badly. In order to overcome this defect, expansion levers 25 are provided and are also supported by the carrier. In the form of the device shown in Fig. 1, these levers 25 have forked ends 26 which are pivoted by pins 27 to lugs 28 formed on the expansion member 12 adjacent to the socket 14. The other ends of the levers 25 are provided with lugs 29 which are arranged between the lugs 16 of the expansion member and the cam 18. When the cam is moved so as to expand the expansion member into engagement with the brake cylinder, the unequal pressure and unequal wear all falls on the inner sides of the lugs 29 which are in contact with the cam, and the outer sides of the lugs 29 bear on the lugs 16 with uniform pressure over their surfaces, and the uneven wear between the expansion member and the brake cylinder is prevented.

The expansion levers have a helical spring 30 secured between their pivoted end portions to hold the lugs 29 in contact with the cam, but this spring may be dispensed with, if desired.

The expansion member 12 preferably has a helical spring 32 secured to lugs 33 on its free end portions, and operating to normally hold it out of engagement with the brake cylinder, but this spring may be dispensed with, if desired, in some instances.

Holes 34 are formed in the expansion levers for the passage of the straight end portions of the spring 32, and the lugs 33 have guides or enlargements 35 on their end portions which work in the holes 34, and prevent the free end portions of the expansion levers from being displaced laterally. Notches 36 are also formed in the projecting portions of the expansion levers below the lugs 29, so as to clear the spring 32.

In the modification shown in Fig. 3, the expansion levers 45 are relatively short, and they are pivoted to the carrier by pins 47, instead of being pivoted to the expansion member. The expansion levers 45 are pressed on the cam by a pin 49 and springs 50, arranged near their lugs 29, instead of by a single spring 30 as shown in Fig. 1. The expansion member is shown made in two parts 12'.

In the modification shown in Fig. 4, the expansion levers 55 are longer than the levers 45, and they have curved portions which extend around the axle, and are pivoted to the carrier by a single pin 57. In this form of the device two pivot pins may be used for the expansion levers similar to the pins 47 shown in Fig. 3, if desired.

In the modification shown in Fig. 5, the expansion levers 55 are differently shaped from those shown in the other figures. These levers 55 have pivot pins, 27 similar to those shown in Fig. 1, and they are pivoted to the expansion member; and they have a pin 49 and helical springs 50 for pressing them on the cam, similar to those shown in Fig. 3.

What I claim is:

1. In a brake, a revoluble brake cylinder, a stationary carrier, an expansion member supported by the carrier, pivoted expansion levers also supported by the carrier and arranged inside the expansion member and provided with lugs which bear on its ends, and an operating cam journaled in the carrier and arranged between the lugs of the expansion levers and operating to expand the expansion member into engagement with the periphery of the brake cylinder.

2. In a brake, a revoluble brake cylinder, a stationary carrier, an expansion member, a pin connecting the middle part of the expansion member with the carrier, expansion levers pivoted to the expansion member adjacent to the said pin and provided with lugs which bear on the ends of the expansion member, and an operating cam journaled in the carrier and engaging with the said lugs.

3. A brake as set forth in claim 1, and having the lugs of the expansion levers held against the cam by spring pressure.

4. A brake as set forth in claim 1, and having the expansion member normally held clear of the brake cylinder by spring pressure.

5. In a brake, a revoluble brake cylinder, a stationary carrier, an expansion member supported by the carrier and having guide lugs near its ends, expansion levers also supported by the carrier and provided with lugs which bear on the ends of the expansion member, said levers having also holes in their end portions which engage with the said guide lugs, a spring having its end portions secured to the said guide lugs and operating to normally hold the expansion member clear of the brake cylinder, and an operating cam journaled in the carrier and arranged between the lugs of the expansion levers.

In testimony whereof I have affixed my signature.

JOSEPH VILLIGER.